(12) United States Patent
Chiu et al.

(10) Patent No.: US 12,271,804 B2
(45) Date of Patent: Apr. 8, 2025

(54) WIRE SEGMENTATION FOR IMAGES USING MACHINE LEARNING

(71) Applicant: Adobe Inc., San Jose, CA (US)

(72) Inventors: Mang Tik Chiu, Champaign, IL (US); Connelly Barnes, Seattle, WA (US); Zijun Wei, San Jose, CA (US); Zhe Lin, Clyde Hill, WA (US); Yuqian Zhou, Champaign, IL (US); Xuaner Zhang, Union City, CA (US); Sohrab Amirghodsi, Seattle, WA (US); Florian Kainz, San Rafael, CA (US); Elya Shechtman, Seattle, WA (US)

(73) Assignee: Adobe Inc., San Jose, CA (US)

(*) Notice: Subject to any disclaimer, the term of this patent is extended or adjusted under 35 U.S.C. 154(b) by 452 days.

(21) Appl. No.: 17/870,496

(22) Filed: Jul. 21, 2022

(65) Prior Publication Data

US 2024/0028871 A1 Jan. 25, 2024

(51) Int. Cl.
  *G06N 3/045* (2023.01)
  *G06T 3/40* (2024.01)
  (Continued)

(52) U.S. Cl.
  CPC .............. *G06N 3/045* (2023.01); *G06T 3/40* (2013.01); *G06T 5/30* (2013.01); *G06T 5/77* (2024.01);
  (Continued)

(58) Field of Classification Search
  CPC .... G06V 10/26; G06V 10/273; G06V 10/454; G06V 10/82; G06T 7/10; G06T 7/11;
  (Continued)

(56) References Cited

U.S. PATENT DOCUMENTS

2019/0333222 A1\* 10/2019 Gatti ................. G06T 7/143
2022/0375100 A1\* 11/2022 Qi .................... G06T 7/194
(Continued)

OTHER PUBLICATIONS

Saurav, Sumeet, et al. "Power line segmentation in aerial images using convolutional neural networks." Pattern Recognition and Machine Intelligence: 8th International Conference, PReMI 2019, Tezpur, India, Dec. 17-20, 2019, Proceedings, Part I. Springer International Publishing, 2019. (Year: 2019).\*

(Continued)

*Primary Examiner* — Geoffrey E Summers
(74) *Attorney, Agent, or Firm* — Nicholson De Vos Webster & Elliott LLP

(57) ABSTRACT

Embodiments are disclosed for performing wire segmentation of images using machine learning. In particular, in one or more embodiments, the disclosed systems and methods comprise receiving an input image, generating, by a first trained neural network model, a global probability map representation of the input image indicating a probability value of each pixel including a representation of wires, and identifying regions of the input image indicated as including the representation of wires. The disclosed systems and methods further comprise, for each region from the identified regions, concatenating the region and information from the global probability map to create a concatenated input, and generating, by a second trained neural network model, a local probability map representation of the region based on the concatenated input, indicating pixels of the region including representations of wires. The disclosed systems and methods further comprise aggregating local probability maps for each region.

20 Claims, 8 Drawing Sheets

(51) Int. Cl.
  *G06T 5/30* (2006.01)
  *G06T 5/77* (2024.01)
  *G06T 7/11* (2017.01)
  *G06T 7/143* (2017.01)
  *G06T 7/187* (2017.01)
  *G06T 7/62* (2017.01)
(52) U.S. Cl.
  CPC .............. *G06T 7/11* (2017.01); *G06T 7/143* (2017.01); *G06T 7/187* (2017.01); *G06T 7/62* (2017.01); *G06T 2207/20084* (2013.01)
(58) Field of Classification Search
  CPC ............. G06T 7/143; G06T 7/187; G06T 2207/20081; G06T 2207/20084; G06T 5/77; G06T 3/40; G06T 5/30; G06T 7/62; G06N 3/02–0985
  See application file for complete search history.

(56) References Cited

U.S. PATENT DOCUMENTS

2023/0118460 A1* 4/2023 Liba .................. G06T 7/155
2023/0386067 A1* 11/2023 De Nigris .............. G01B 11/00

OTHER PUBLICATIONS

Qiao, Kai, et al. "Wire segmentation for printed circuit board using deep convolutional neural network and graph cut model." IET Image Processing 12.5 (2018): 793-800. (Year: 2018).*
Matsui, Takuro, and Masaaki Ikehara. "Single-image fence removal using deep convolutional neural network." IEEE Access 8 (2019): 38846-38854. (Year: 2019).*
Madaan, Ratnesh, Daniel Maturana, and Sebastian Scherer. "Wire detection using synthetic data and dilated convolutional networks for unmanned aerial vehicles." 2017 IEEE/RSJ International Conference on Intelligent Robots and Systems (IROS). IEEE, 2017. (Year: 2017).*
Li, Bo, et al. "Transmission line detection in aerial images: An instance segmentation approach based on multitask neural networks." Signal Processing: Image Communication 96 (2021): 116278. (Year: 2021).*
Lee, Sang Jun, et al. "Weakly supervised learning with convolutional neural networks for power line localization." 2017 IEEE Symposium Series on Computational Intelligence (SSCI). IEEE, 2017. (Year: 2017).*
Li, Yan, et al. "Power line detection by pyramidal patch classification." IEEE Transactions on Emerging Topics in Computational Intelligence 3.6 (2018): 416-426. (Year: 2018).*
Chen, Wuyang, et al. "Collaborative Global-Local Networks for Memory-Efficient Segmentation of Ultra-High Resolution Images." 2019 IEEE/CVF Conference on Computer Vision and Pattern Recognition (CVPR). IEEE, 2019. (Year: 2019).*
Abdelfattah et al., "TTPLA: An Aerial-Image Dataset for Detection and Segmentation of Transmission Towers and Power Lines", In Proceedings of the Asian Conference on Computer Vision, 2020, 17 pages.
Barnes et al., "PatchMatch: A Randomized Correspondence Algorithm for Structural Image Editing", ACM Trans. Graph., 28(3):24, Jul. 27, 2009, 10 pages.
Chen et al., "Collaborative Global-Local Networks for Memory-Efficient Segmentation of Ultra-High Resolution Images", In Proceedings of the IEEE/CVF Conference on Computer Vision and Pattern Recognition, May 2019, pp. 8924-8933.
Chen et al., "DeepLab: Semantic Image Segmentation with Deep Convolutional Nets, Atrous Convolution, and Fully Connected CRFs", IEEE transactions on pattern analysis and machine intelligence, 40(4), arXiv:1606.00915v2 [cs.CV], May 12, 2017, 14 pages.
Chen et al., "Encoder-Decoder with Atrous Separable Convolution for Semantic Image Segmentation", Proceedings of the European Conference on Computer Vision (ECCV), Sep. 2018, pp. 833-851.
Chen et al., "Rethinking Atrous Convolution for Semantic Image Segmentation", arXiv:1706.05587v2 [cs.CV], Aug. 8, 2017, 11 pages.
Cheng et al., "CascadePSP: Toward Class-Agnostic and Very High-Resolution Segmentation via Global and Local Refinement," Proceedings of the IEEE/CVF Conference on Computer Vision and Pattern Recognition, May 2020, pp. 8890-8899.
Dosovitskiy et al., "An image is worth 16x16 words: Transformers for image recognition at scale", ICLR, arXiv:2010.11929v2 [cs.CV], Jun. 2, 2021, 22 pages.
He et al., "Deep Residual Learning for Image Recognition," Proceedings of the 2016 IEEE Conference on Computer Vision and Pattern Recognition (CVPR), Jun. 2016, pp. 770-778.
Huang et al., "CCNet: Criss-Cross Attention for Semantic Segmentation," Proceedings of the IEEE/CVF International Conference on Computer Vision, 2019, pp. 603-612.
Huynh et al., "Progressive Semantic Segmentation," Proceedings of the IEEE/CVF Conference on Computer Vision and Pattern Recognition, Apr. 8, 2021, pp. 16755-16764.
Jayasinghe et al., "SwiftLane: Towards Fast and Efficient Lane Detection," arXiv:2110.11779v1 [cs.CV], Oct. 22, 2021, 7 pages.
Li et al., "Transmission line detection in aerial images: An instance segmentation approach based on multitask neural networks", Signal Processing: Image Communication, vol. 96, Aug. 2021, 116278, pp. 1-9.
Lin et al., "Focal Loss for Dense Object Detection," Proceedings of the IEEE International Conference on Computer Vision, 2017, pp. 2980-2988.
Liu et al., "Swin Transformer: Hierarchical Vision Transformer using Shifted Windows", arXiv:2103.14030v2 [cs.CV], Aug. 17, 2021, 14 pages.
Loshchilov et al., "Decoupled Weight Decay Regularization", ICLR 2019, arXiv:1711.05101v3 [cs.LG], Jan. 4, 2019, 19 pages.
Nguyen et al., "LS-Net: Fast Single-Shot Line-Segment Detector," arXiv:1912.09532v2 [cs.CV], Jan. 24, 2020, 14 pages.
Ranftl et al., "Vision Transformers for Dense Prediction", In Proceedings of the IEEE/CVF International Conference on Computer Vision, Mar. 2021, pp. 12179-12188.
Shrivastava et al., "Training Region-Based Object Detectors With Online Hard Example Mining," Proceedings of the IEEE Conference on Computer Vision and Pattern Recognition (CVPR), 2016, pp. 761-769.
Su et al., "Structure Guided Lane Detection", arXiv:2105.05403v2 [cs.CV], Jun. 10, 2021, 8 pages.
Tabelini et al., "Keep your Eyes on the Lane: Real-time Attention-guided Lane Detection", 2021 IEEE/CVF Conference on Computer Vision and Pattern Recognition (CVPR), Jun. 2021, pp. 294-302.
Vaswani et al., "Attention Is All You Need", Advances in Neural Information Processing Systems 30 (NIPS 2017), 2017, 11 pages.
Xie et al., "SegFormer: Simple and Efficient Design for Semantic Segmentation with Transformers", 35th Conference on Neural Information Processing Systems (NeurIPS 2021), Dec. 2021, 14 pages.
Xu et al., "Line Segment Detection Using Transformers without Edges", 2021 IEEE/CVF Conference on Computer Vision and Pattern Recognition (CVPR), Jun. 2021, pp. 4257-4266.
Yetgin et al., "Powerline ImageDataset (Infrared-IR and Visible Light-VL)", available online at <https://data.mendeley.com/datasets/n6wrv4ry6v/7>, Jun. 25, 2019, 3 pages.
Zhang et al., "Detecting power lines in UAV images with convolutional features and structured constraints", Remote Sensing, 11:1342, Jun. 2019, 17 pages.
Zhang et al., "PPGNet: Learning Point-Pair Graph for Line Segment Detection", 2019 IEEE/CVF Conference on Computer Vision and Pattern Recognition (CVPR), Jun. 2019, pp. 7105-7114.
Zhao et al., "Pyramid Scene Parsing Network," 2017 IEEE Conference on Computer Vision and Pattern Recognition (CVPR), Dec. 2016, pp. 2881-2890.

(56) References Cited

OTHER PUBLICATIONS

Zheng et al., "Rethinking Semantic Segmentation from a Sequence-to-Sequence Perspective with Transformers", In Proceedings of the IEEE/CVF Conference on Computer Vision and Pattern Recognition, 2021, pp. 6881-6890.

* cited by examiner

WIRE SEGMENTATION FOR IMAGES USING MACHINE LEARNING

BACKGROUND

Image retouching is an important component in producing high-quality photographic images. When wires and wire-like objects, electrical wires/cables, power lines, supporting/connecting wires, and any wire-like object that resemble a wire structure, are present in an image, the composition of the image can be negatively impacted. As such, image retouching is employed to remove such "distractors" to improve the visual quality of the image. Removing wire-like objects can be performed by segmenting out the wire-like object by creating a mask to enclose the wire region and removing the selected wire by removing the masked regions and filling in the removed regions with new content.

SUMMARY

Introduced here are techniques/technologies that allow a digital design system to perform wire segmentation for images using machine learning. In particular, in one or more embodiments, the digital design system can receive an image (e.g., a high-resolution photographic image) as an input and process the image through a two-stage encoder-decoder network pipeline. In the first stage, the image is downsampled and passed through a first encoder-decoder network that includes a coarse decoder to capture the global contextual information from the image at the downsampled resolution and indicate the image regions predicted to include wires in a global logit map. In the second stage, the global logit map is used to identify patches of the image predicted to include wires. Each of the identified patches are individually concatenated with the global logit map and passed through a second encoder-decoder network that includes a fine decoder that generates local logit maps that indicate the wire pixels (e.g., pixels predicted to be associated with wires or wire-like objects) for the associated patch. The wire segmentation for the image at its original high resolution can then be determined using the results for the smaller patches.

The two-stage encoder-decoder network is trained using training data that includes images annotated with masks for wires and/or wire-like objects of various sizes (e.g., thicknesses) and appearances (e.g., wire shapes and occlusions).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
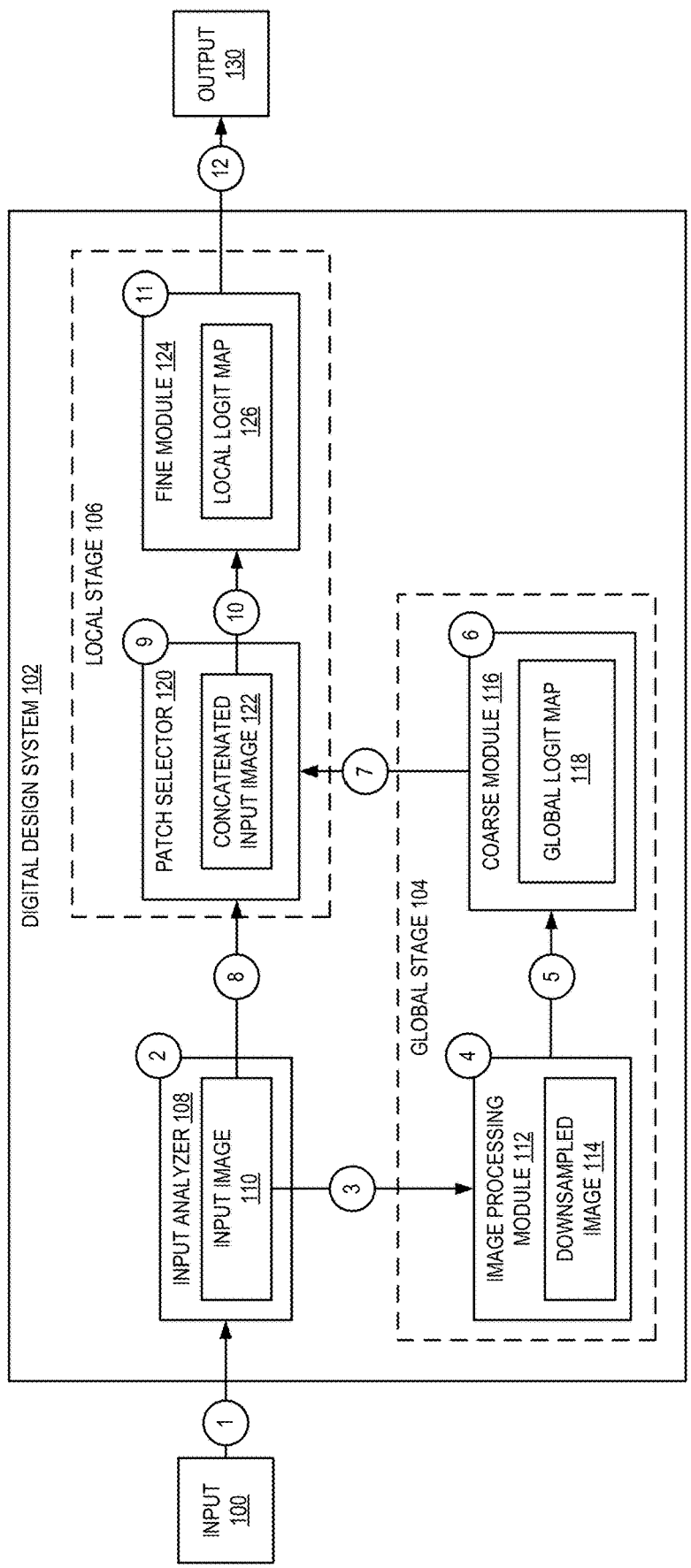
FIG. 1 illustrates a diagram of a process of performing wire segmentation for images using trained networks in accordance with one or more embodiments.

One or more embodiments of the present disclosure include a digital design system that uses trained encoder-decoder networks to perform wire segmentation of wires and wire-like objects in images. Wire segmentation has a similar problem formulation to common object semantic segmentation, as they both take in an image and create dense predictions at each pixel. However, wire segmentation involves additional properties that make predicting wire pixels particularly challenging. First, the majority of wires have a common property of being long and thin, sometimes spanning across the entire image yet being only a handful of pixels in width. Second, input images can have arbitrarily high resolutions (e.g., 10 k×10 k pixels or more). Third, wires are not necessarily continuous and can be partially hidden behind other objects such as vegetation and buildings.

Existing solutions require manual wire segmentation, which can be time-consuming and prone to error. Other existing solutions are directed to transformer models that use self-attention for semantic segmentation which let them attend to objects that span across larger portions of a feature map. However, when applied to wire segmentation in high-resolution images, these solutions either drop significantly in segmentation quality or require very long inference times.

Other solutions include transmission line detection (TLD) systems used in aerial imaging using drones. In such solutions, convolutional neural networks are used to segment overhanging power cables in outdoor scenes. However, the datasets for TLD systems consists of wire patterns that are relatively consistent, where several evenly spaced wires span across parts of an image. At the same time, these wires have very similar appearances due to similar lighting conditions and backgrounds. These TLD systems are unreliable where images often contain various patterns of wires attached to different structures, and exhibit significantly different color, lighting and texture patterns.

To address these issues, the digital design system processes an input image through a two-stage encoder-decoder network. In the first stage, the image is downsampled from its original resolution and passed through a coarse module that includes an encoder and a coarse decoder. The coarse module captures the global contextual information from the input image at the downsampled resolution and generates a global logit map indicating predicted wire regions. In the second stage, the global logit map is used to identify patches of the full resolution input image that include a percentage of wire pixels above a threshold amount. Each of the identified patches are concatenated with the global logit map and passed through a fine module that includes an encoder and a fine decoder. The fine module generates a local logit map for each identified path, which indicates the wire pixels (e.g., pixels predicted to be associated with wires or wire-like objects) for the associated patch. The results generated by the fine module for each of the identified patches are then aggregated and used to generate the wire segmentation of the input image at its original resolution.

By performing a two-stage process uses a coarse module to capture the entire wire and its surrounding contextual information at a lower resolution, and then uses a fine module to capture detailed textures of the wire at the original resolution, the embodiments described herein provide over existing solutions. For example, wires and wire-like objects can be long and thin (e.g., spanning over several thousand pixels in length but only several pixels in width), and thus be present in a small number of pixels relative to the large number of pixels in a high resolution image. Due to limitations of the memory size of modern GPUs, the entire image at full-resolution cannot be passed to a model for inference. For example, high-resolution images (e.g., 5K×5K pixel images) cannot be passed in full-resolution to most GPUs, as they would run out of memory.

Further, performing a local refinement by running a sliding window over the entire image at a high resolution, and then performing the fine stage only on regions or patches of the image that include a percentage of wire pixels above a threshold value provides additional benefits and advantages. For example, through conditioning on the global wire probability from the coarse module, computation time is preserved by only performing the fine stage on regions where there are likely wires present. Further, by passing the global logit to the fine module, the fine module can leverage the extra contextual information for a better inference quality.

FIG. 1 illustrates a diagram of a process of performing wire segmentation for images using trained networks in accordance with one or more embodiments. As shown in FIG. 1, a digital design system 102 receives an input 100, as shown at numeral 1. For example, the digital design system 102 receives the input 100 from a user via a computing device or from a memory or storage location. In one or more embodiments, the input 100 includes at least an input image (e.g., input image 110) that includes a representation of wires. For example, the input image 110 can be a high quality photographic image.

As illustrated in FIG. 1, the digital design system 102 includes an input analyzer 108 that receives the input 100. In some embodiments, the input analyzer 108 analyzes the input 100, at numeral 2. In some embodiments, the input analyzer 108 analyzes the input 100 to identify the input image 110. After the input analyzer 108 analyzes the input 100, the input image 110 is sent to an image processing module 112, as shown at numeral 3.

The wire segmentation process is a two-stage pipeline that includes a global stage 104 and a local stage 106 that includes a coarse module 116 and a fine module 124, respectively. The coarse module 116 includes an encoder, E, and a coarse decoder $D_C$. The fine module 124 includes an encoder, E, and a fine decoder $D_F$. In one or more embodiments, the coarse module 116 and the fine module 124 share the same encoder.

As part of the global stage 104 of the wire segmentation process, the image processing module 112 generates downsampled image 114 using input image 110, at numeral 4. For example, given a high-resolution image $I_{glo}$, image processing module 112 bilinearly downsamples $I_{glo}$ to $I_{ds}$, with a fixed size of p×p pixel dimensions.

In one or more embodiments, to preserve the presence of wires when the input image 110 is downsampled, the image processing module 112 uses luminance min-filters and max-filters. For example, when the input image 110 includes a black wire across a white background, the luminance min-filter takes the minimum of pixels in corresponding regions when generated the min-filtered downsampled image, preserving the black wire, while the luminance max-filter would result in an image with all white pixels. Conversely, when the input image 110 includes a white wire across a black background, the luminance max-filter takes the maximum of pixels in corresponding regions when generating the max-filtered downsampled image, preserving the white wire, while the luminance min-filter would result in an image with all black pixels. The results of the luminance min-filter and the luminance max-filter is then concatenated with the R, G, and B channels to generate the downsampled image 114 as a five channel image.

The downsampled image 114 is then sent to coarse module 116, as shown at numeral 5. In one or more embodiments, the coarse module 116 can be trained to capture global contextual information from the entire downsampled image 114 and highlights the regions of the downsampled image 114 determined to likely include wire pixels at a coarse level. Using the downsampled image 114, the coarse module 116 predicts a global logit map 118, at numeral 6. The global logit map 118, which can be expressed as $Z_{glo}=I_{glo}^{ds}$, contains the activation of the wire regions with rich global contextual information. For example, the global logit map 118 can indicate the wire pixels of the downsampled image 114 (e.g., the pixels of the image where wires are predicted). $Z_{glo}$ can then serve as the guidance for wire segmentation refinement performed in the local stage 106. After the coarse module 116 predicts the global logit map 118, the global logit map 118 is sent to a patch selector 120, as shown at numeral 7. The patch selector 120 can further receive or retrieve the input image 110, as shown at numeral 8. In some embodiments, the input image 110 can be retrieved from a memory or storage location.

As part of the local stage 106 of the wire segmentation process, the patch selector 120 is configured to generate a concatenated input image 122, at numeral 9. Using the input image 110 at the original image resolution and the global logit map 118 generated using the downsampled image 114 at a lower resolution, the patch selector 120 can perform a sliding window analysis of the input image 110. In the sliding window analysis, the patch selector can identify patches (e.g., regions, segments, etc.) of the input image 110 that include a percentage of wire pixels above a threshold value based on the global logit map 118. In one or more embodiments, patches can be overlapping. For each identified patch, the patch selector generates a concatenated input image 122 by concatenating the identified patch from the input image 110, the global logit map 118, and a binary location map, using channel-wise concatenation.

Figure 2:
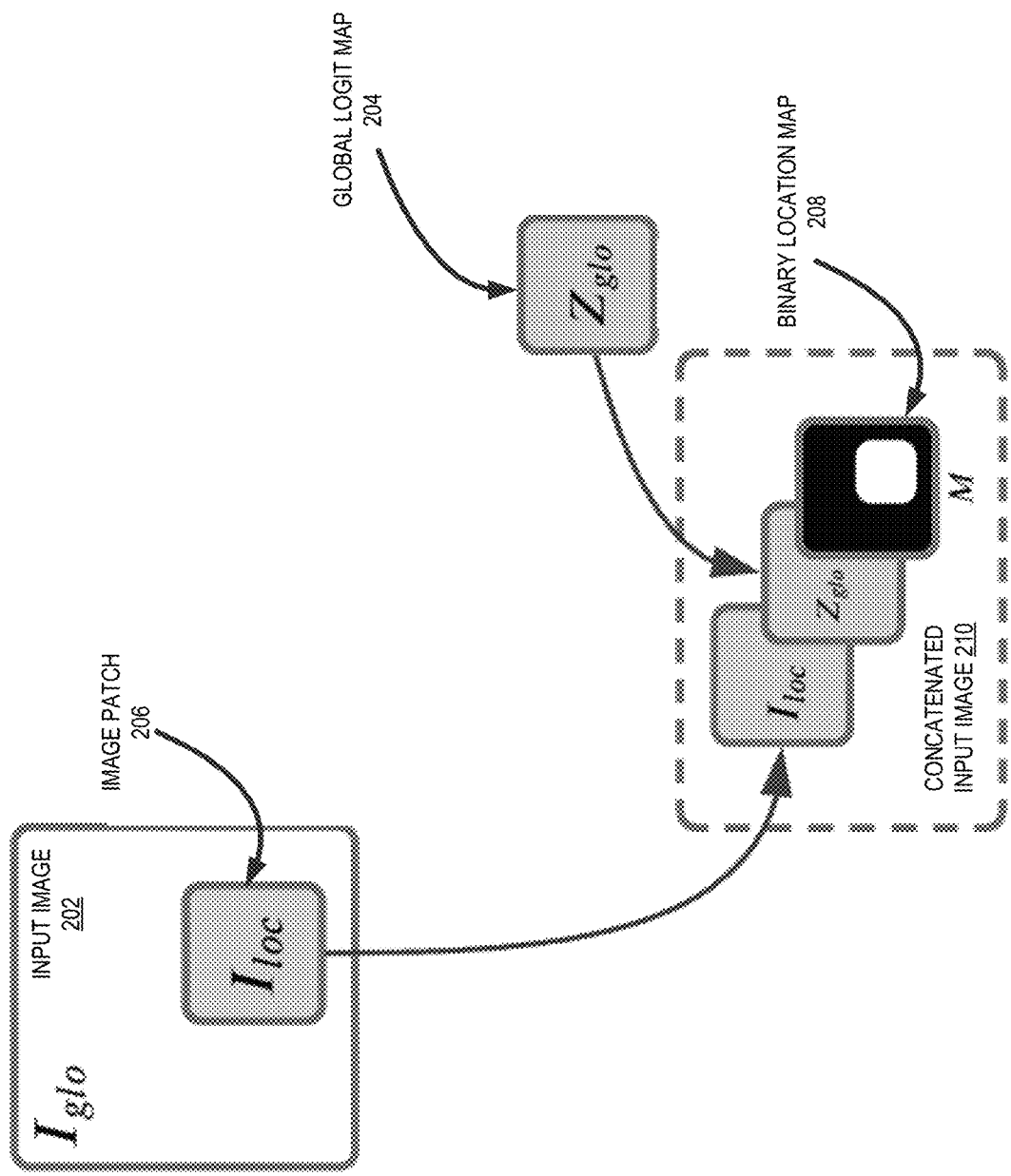
FIG. 2 illustrates an example concatenated input image in accordance with one or more embodiments.

FIG. 2 illustrates an example concatenated input image in accordance with one or more embodiments. As illustrated in FIG. 2, after processing a downsampled version of input image 202, $I_{glo}$, a global logit map 204, $Z_{glo}$, is predicted by a coarse module (e.g., coarse module 116). Using a sliding window analysis to identify patches or regions of the input image 202 with a percentage of wire pixels above a threshold value (e.g., 0.1% of the pixels are likely wire pixels), at least image patch 206, $I_{loc}$, is identified. The binary location map 208 is a representation of the input image 202 with the pixels of the image patch 206 assigned a value of "1" (e.g., depicted in white) and all other pixels of the image patch 206 assigned a value of 0 (e.g., depicted in black). The image patch 206, the global logit map 204, and the binary location map 208 are then combined by the patch selector using channel-wise concatenation to create concatenated image 210.

In embodiments where the coarse module 116 and the fine module 124 share the same encoder, the inputs to the encoder for both the coarse module 116 and the fine module 124 should have the same number of channels. In order to match the number of channels as the inputs to the fine module 124, the downsampled image 114 can be concatenated with two additional zero channels.

In one or more other embodiments, instead of concatenating the image patch 206, the global logit map 204, and the binary location map 208, the global logit map 204 can be cropped to correspond to the image patch 206. In such embodiments, the concatenated image 210 would be generated using channel-wise concatenation of the just the image patch 206 and a cropped version of the global logit map 204 covering the corresponding pixels of the image patch 206.

Returning to FIG. 1, the concatenated input image 122 is then sent to fine module 124, as shown at numeral 10. In one or more embodiments, the fine module 124 includes an encoder, E, and a fine decoder $D_F$, and can be trained to process patches that are most likely to contain wires based on the predictions of the coarse module 116. For each patch, $I_{loc}$, of size p×bp pixel dimensions cropped from the input image 110 in its original resolution, the fine module 124 predicts a local logit map 126, at numeral 11. In one or more embodiments, the local logit map 126 can be expressed as: $Z_{loc}=D_F(E(I_{loc}, Z_{glo}, M))$. The fine module 124 repeats the process for each patch of the input image 110 identified by the patch selector 120. In one or more embodiments, the results from all of the identified patches can then be aggregated. Each pixel in the local logit map 126 for the input image 110 is assigned a value of "0," indicating the pixel is a background pixel, or "1," indicating the pixel is a wire pixel.

In one or more embodiments, the digital design system 102 provides an output 130, as shown at numeral 12. The output 130 can include an output image, which can be a modified version of the input image 110 with a wire segmentation map based on the local logit map 126. The wire segmentation map can indicate the identified wire pixels (e.g., as a wire segmentation mask), where the wire pixels can include the pixels that include representations of wires or wire-like objects and additional pixels representing the boundary of the wires or wire-like objects and a background or foreground object. In other embodiments, the output 130 includes a binary map corresponding to the input image 110, where the wire pixels are assigned a value of "1" and all other pixels are assigned a value of "0", or vice versa. In some embodiments, In one or more embodiments, after the process described above in numerals 1-11 the output 130 can be sent to the user or computing device that initiated the wire segmentation process with the digital design system 102, to another computing device associated with the user or another user, or to another system or application. For example, after the process described above in numerals 1-11, the output 130 can be displayed in a user interface of a computing device.

In some embodiments, the digital design system 102 can further remove the wire pixels (e.g., using a content aware fill process) or send the modified version of the input image 110 to another application to remove the wire pixels, prior to providing the modified version of the input image 110 in the output 130.

In one or more embodiments, the digital design system 102, or another application, can provide an interface to allow a user to select wire segmentation masks, or portions of wire segmentation masks, from the output image for removal. For example, the interface can include a brush selector interface element that allows a user to select a brush or editor size and whether to subtract a wire segmentation mask that was incorrectly generated (e.g., a pet leash, etc.) or to add back a wire segmentation mask that were previously subtracted from the output image.

In some embodiments, the wire segmentation map can result in incomplete masking of a wire or overestimation of a wire. For example, instead of a single wire segmentation mask encompassing a wire, the wire segmentation map may have captured the single wire in a plurality of unconnected masks. In such embodiments, the digital design system 102 can provide an interface to allow a user to select one or more wire segmentation masks, or all wire segmentation masks, and adjust a threshold used to determine whether a pixel is a wire pixel or a background pixel when predicting the wire segmentation map. For example, adjusting the threshold lower can result in additional pixels being identified as wire pixels, where the threshold can be lowered until the entire wire is within a single wire segmentation mask. Conversely, where the wire segmentation captures excessive pixels in addition to those including the representation of the wire, adjusting the threshold higher can result in fewer pixels being identified as wire pixels. In such embodiments, as the threshold is adjusted, the wire segmentation process described above would be repeated using the new threshold.

In one or more embodiments, the digital design system 102 can perform additional post-processing on the wire segmentation map of the modified version of the input image 110. For example, to account for any errors in the predictions by the coarse module 116 and the fine module 124, the digital design system 102 can estimate the diameter of the wire or wire-like object and dilate the predicted wire segmentation. One solution is to dilate the prediction by a fixed amount.

Another solution to address possible errors in the prediction can be to dilate the prediction based on diameter of the wire or wire-like object. In one or more embodiments, the wire diameter is estimated by first extracting the pixels on the boundary of the wire from the prediction (e.g., the wire segmentation map). The boundary pixels can be pixels that are predicted to be interior of the wire (e.g., assigned a value of "1") and neighboring a pixel that is exterior of the wire (e.g., assigned a value of "0"). Then, for each point on the boundary of the wire, a gradient direction is computed and normalized (e.g., to a unit length). In one or more embodiments, a blur kernel can be applied to the wire segmentation map prior to computing the gradients to suppress noise. For each point, a ray is then applied starting at its point on the boundary in the direction of the normalized gradient, and the distance is measured (e.g., in unit lengths) from that point on the boundary to the point where the ray exits the wire on the opposite side. The results are estimated wire diameters from each boundary pixel of the wire. In one or more embodiments, to account for any noise (e.g., caused by bumps in the wire that result in some rays being shorter or longer than other rays), a blur kernel is applied to smooth the diameter estimate using pixel-wise division, as follows:

$$D' = \frac{(D * G)}{(B * G)}$$

where D is the diameter estimated at the boundary pixels, B is the boundary indicator map, and * represents convolutions with a kernel (e.g., a Gaussian kernel). The resulting output, D', indicates a diameter for each boundary pixel.

Using the diameter for each boundary pixel, the predicted wire segmentation mask can be dilated using the following formula:

$$\text{Dilation Amount} = aD' + b$$

where a and b are constants and D' is the estimated wire diameter. Dilation is performed proportionally to the diameter of the wire (e.g., larger wires will have a larger dilation and smaller wires will have a smaller dilation). After computing the dilation amount for each boundary pixel, the digital design system 102 computes the dilated wire segmentation mask. In one embodiment, for each boundary pixel, a structuring element (e.g., a disk or square) is generated based on the corresponding dilation amount for the boundary pixel, where the structuring element will include pixels assigned values associated with wire pixels (e.g., "1" using the example above). In other embodiments, the dilated wire segmentation mask can be computed using other means (e.g., blurring operations, repeated integration, etc.).

Figure 3:
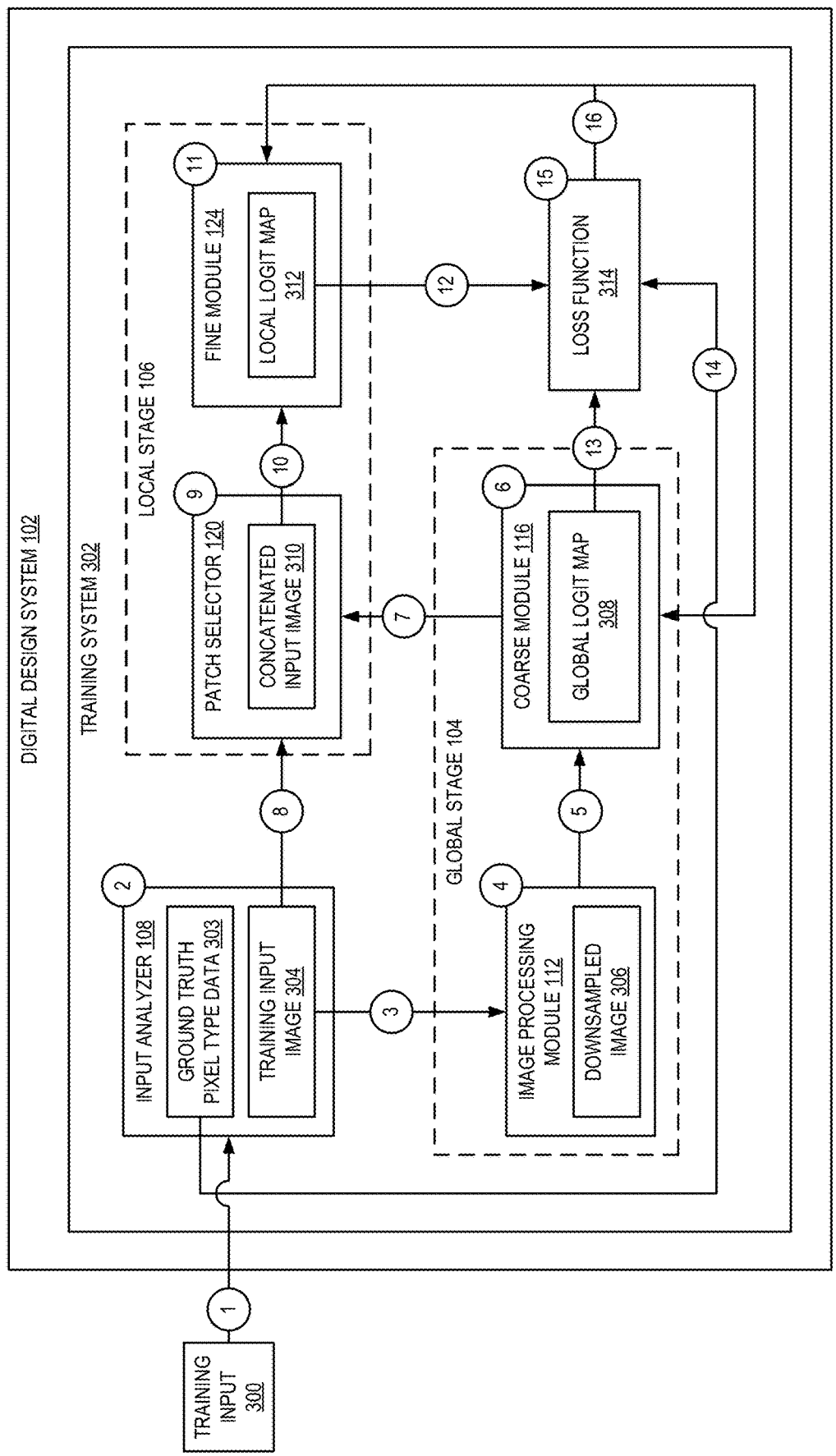
FIG. 3 illustrates a diagram of a process of training machine learning models to perform wire segmentation for images in accordance with one or more embodiments.

FIG. 3 illustrates a diagram of a process of training machine learning models to perform wire segmentation for images in accordance with one or more embodiments. In one or more embodiments, a training system 302 is configured to train neural networks (e.g., coarse module 116 and fine module 124) to generate logit maps indicating pixels of images that include wire or wire-like objects. In some embodiments, the training system 302 is a part of a digital design system 102. In other embodiments, the training system 302 can be a standalone system, or part of another system, and deployed to the digital design system 102. For example, the training system 302 may be implemented as a separate system implemented on electronic devices separate from the electronic devices implementing digital design system 102. As shown in FIG. 3, the digital design system 102 receives a training input 300, as shown at numeral 1. For example, the digital design system 102 receives the training input 300 from a user via a computing device or from a memory or storage location. In one or more embodiments, the training input 300 includes at least a training input image (e.g., training input image 304) that includes a representation of wires. For example, the training input image 304 can be a high quality photographic image.

In one or more embodiments, the training input 300 can include multiple training input images and corresponding ground truth logit maps that can be fed to the training system 302 in parallel or in series. The training input images can be a dataset that includes various scene types (e.g., urban, rural, landscapes, and street scenes) taken using different devices (e.g., DSLRs, smartphone cameras, etc.) so that the dataset can include images with a variety of resolutions and that have gone through different image processing pipelines. The training input images can be further annotated with detailed masks over the wires and wire-like objects. In one or more embodiments, the annotated wire segmentation mask can also be dilated to enclose not only the main wire body, but also the boundary of the wire (e.g., a gradient falloff between wire and background) to ensure that residual artifacts after wire removal are minimized.

As illustrated in FIG. 1, the training system 302 includes an input analyzer 108 that receives the training input 300. In some embodiments, the input analyzer 108 analyzes the training input 300, at numeral 2. In some embodiments, the input analyzer 108 analyzes the training input 300 to identify ground truth pixel type data 303 and the training input image 304. The ground truth pixel type data 303 can include category indices for each pixel, where background pixels are assigned a value of "0" and foreground pixels are assigned a value of "1". After the input analyzer 108 analyzes the training input 300, the training input image 304 is sent to an image processing module 112, as shown at numeral 3.

As described previously, the wire segmentation process is a two-stage pipeline that includes a global stage 104 and a local stage 106 that includes a coarse module 116 and a fine module 124, respectively. The coarse module 116 includes an encoder, E, and a coarse decoder $D_C$. The fine module 124 includes an encoder, E, and a fine decoder $D_F$. In one or more embodiments, the coarse module 116 and the fine module 124 share the same encoder.

As part of the global stage 104 of the wire segmentation process, the image processing module 112 generates downsampled image 306 from training input image 304, at numeral 4. For example, given a high-resolution image $I_{glo}$, image processing module 112 bilinearly downsamples $I_{glo}$ to $I_{ds}$, with a fixed size of p×p pixel dimensions. In one or more embodiments, the image processing module 112 further applies data augmentation (e.g., random scaling, rotation, horizontal flipping and photometric distortion) to the high-resolution image to obtain $I_{glo}$ to prevent the network from over-fitting to training data and to expose the network to additional scenarios. The downsampled image 306 is then sent to coarse module 116, as shown at numeral 5.

In one or more embodiments, the coarse module 116 captures global contextual information from the downsampled image 306 and highlights the regions determined to likely include wire pixels at a coarse level. Using the downsampled image 114, the coarse module 116 predicts a global logit map 308, at numeral 6. The global logit map 308, which can be expressed as $Z_{glo} = I_{glo}^{ds}$, contains the activation of the wire regions with rich global contextual information. For example, the global logit map 308 can indicate the wire pixels of the downsampled image 306 (e.g., the pixels of the image where wires are predicted). $Z_{glo}$ can then serve as the guidance for wire segmentation refinement performed in the local stage 106. After the coarse module 116 predicts the global logit map 308, the global logit map 308 is sent to a patch selector 120, as shown at numeral 7. The patch selector 120 can further receive or retrieve the training input image 304, as shown at numeral 8. In some embodiments, the training input image 304 can be retrieved from a memory or storage location.

As part of the local stage 106 of the wire segmentation process, the patch selector 120 is configured to generate a concatenated input image 310, at numeral 9. Using the training input image 304 at the original image resolution and the global logit map 308 generated using the downsampled image 306 at a lower resolution, the patch selector 120 selects a patch (e.g., region, segment, etc.) of the training input image 304 that include a percentage of wire pixels above a threshold value (e.g., at least one percent wire pixels). In one embodiment, the selected patch has a patch size, p, of 512 pixels. In other embodiments, the patch size of the selected patch can be smaller or larger. In one or more embodiments, the patch selector 120 can select the patch with the highest percentage of wire pixels or can randomly select the patch from a set of patches having a percentage of wire pixels above the threshold value. For the selected patch, the patch selector generates a concatenated input image 310 by concatenating the identified patch from the training input image 304, the global logit map 308, and a binary location map, using channel-wise concatenation. The binary location map is a representation of the training input image 304 with the pixels of the identified patch assigned a value of "1" and all other pixels of the identified patch assigned a value of "0".

The concatenated input image 310 is then sent to fine module 124, as shown at numeral 10. In one or more embodiments, the fine module 124 includes an encoder, E, and a fine decoder $D_F$, and can be trained to process the concatenated input image 310 based on the predictions of the coarse module 116. For the identified patch, $I_{loc}$, of size p×p pixel dimensions cropped from the training input image 304 in its original resolution, the fine module 124 predicts a local logit map 312, at numeral 11. In one or more embodiments, the local logit map 312 can be expressed as: $Z_{loc}=D_F(E(I_{loc}, Z_{glo}, M))$. Each pixel in the local logit map 312 for the training input image 304 is assigned either a value of "0," indicating the pixel is a background pixel, or "1," indicating the pixel is a wire pixel.

After the fine module 124 generates the local logit map 312, the local logit map 312 is sent to a loss function 314, as shown at numeral 12. The loss function 314 also receives or retrieves global logit map 308, at numeral 13, and the ground truth pixel type data 303 from the training input 300, as shown at numeral 14. The training system 302 then calculates the loss using the global logit map 308, the local logit map 312, and the ground truth pixel type data 303 using loss function 314, at numeral 15. In one or more embodiments, a cross entropy (CE) loss is applied to a global probability map, $P_{glo}$, and a local probability map, $P_{loc}$, generated using the global logit map 308, $Z_{glo}$, and local logit map 312, $Z_{loc}$, respectively. A Soft-Max operation is applied to the logit maps to generate the global and local probability maps, as follows:

$$P_{glo}=\text{SoftMax}(Z_{glo})$$

$$P_{loc}=\text{SoftMax}(Z_{loc})$$

The CE loss can then be calculated using ground truth annotations $G_{glo}$ and $G_{loc}$, as follows:

$$\mathcal{L}_{glo}=CE(P_{glo}, G_{glo})$$

$$\mathcal{L}_{loc}=CE(P_{loc}, G_{loc})$$

The final loss, is the sum of the global CE loss, $\mathcal{L}_{glo}$, and the local CE loss, $\mathcal{L}_{loc}$:

$$\mathcal{L}=\mathcal{L}_{glo}+\lambda\mathcal{L}_{loc}$$

where λ is set to a value of "1" during training.

The loss, $\mathcal{L}$, is then backpropagated to the coarse module 116 and the fine module 124, as shown at numeral 16, and used to optimize the encoder-decoder networks.

Figure 4:
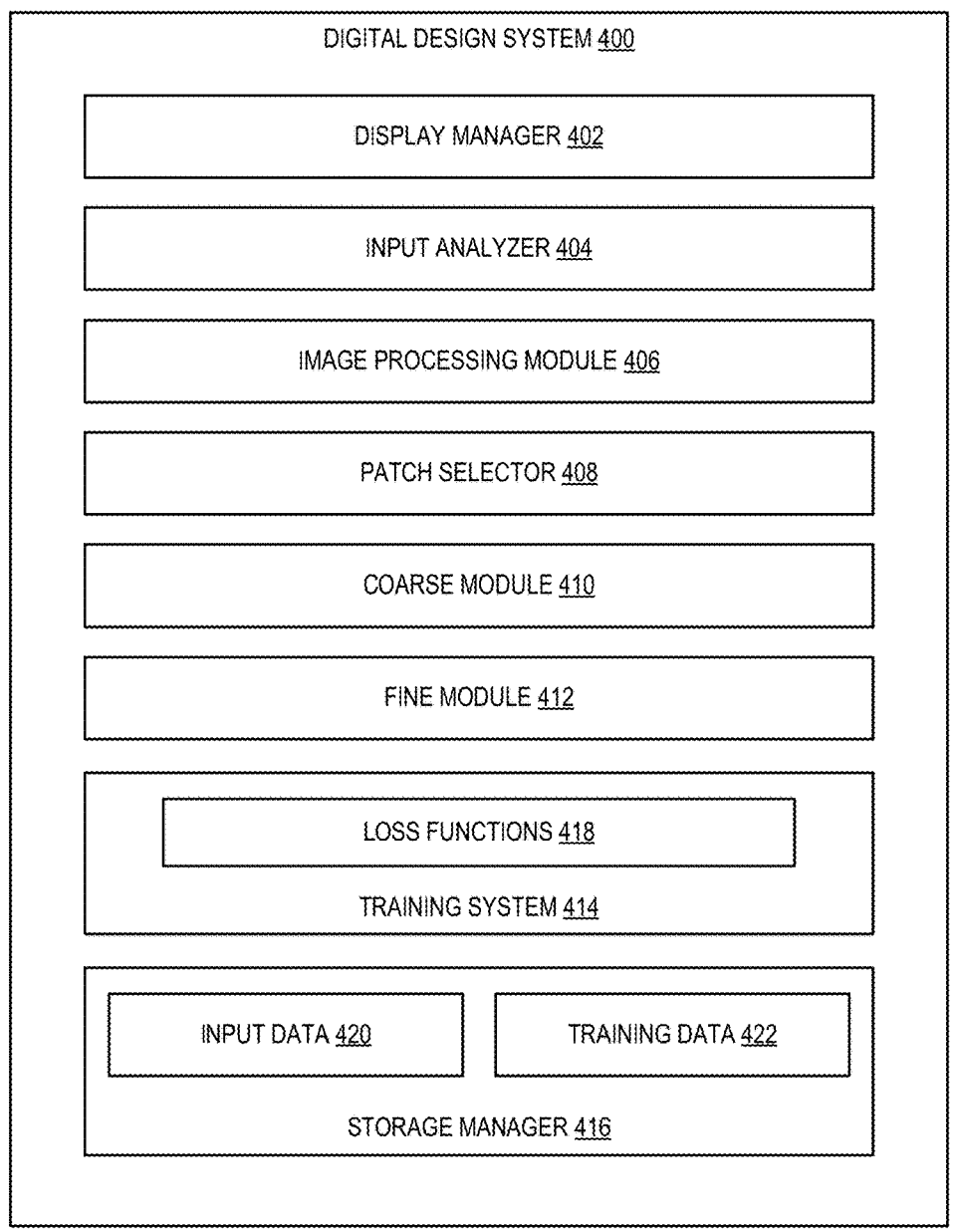
FIG. 4 illustrates a schematic diagram of a digital design system in accordance with one or more embodiments.

FIG. 4 illustrates a schematic diagram of a digital design system (e.g., "digital design system" described above) in accordance with one or more embodiments. As shown, the digital design system 400 may include, but is not limited to, a display manager 402, an input analyzer 404, an image processing module 406, a patch selector 408, a coarse module 410, a fine module 412, a training system 414, and a storage manager 416. As shown, the training system 414 includes loss functions 418. The storage manager 416 includes input data 420 and training data 422.

As illustrated in FIG. 4, the digital design system 400 includes a display manager 402. In one or more embodiments, the display manager 402 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 402 may identify, display, update, or otherwise provide various user interfaces that include one or more display elements in various layouts. In one or more embodiments, the display manager 402 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 4, the digital design system 400 also includes an input analyzer 404. The input analyzer 404 analyzes an input received by the digital design system 400 to identify input images. During a training process, the input analyzer 404 further analyzes a training input to identify ground truth logit maps. As further illustrated in FIG. 4, the digital design system 400 also includes an image processing module 406 configured to receive input images in an original high resolution and bilinearly downsample the original high resolution input image to a lower resolution.

As further illustrated in FIG. 4, the digital design system 400 also patch selector 408. During a training process, the patch selector 408 can select a patch (e.g., region, segment, etc.) of a training input image that include a percentage of wire pixels above a threshold value (e.g., at least one percent wire pixels) based on a global logit map indicating wire pixels. In one or more embodiments, the patch selector 408 can select the patch with the highest percentage of wire pixels or can randomly select the patch from a set of patches having a percentage of wire pixels above the threshold value. During an inference process, the patch selector 408 can perform a sliding window analysis of the input image using indications of wire pixels from a global logit map. In the sliding window analysis, the patch selector can identify patches of the input image that include a percentage of wire pixels above a threshold value based on the global logit map. During both training and inference, the patch selector 408 is further configured to generate concatenated input images using the selected patch and a corresponding global logit map.

As further illustrated in FIG. 4, the digital design system 400 also a coarse module 410 configured to capture the global contextual information from an image in a downsampled resolution and highlight the image regions (e.g., pixels) predicted to include representations of wires or wire-like objects at a coarse level. The coarse module 410 can be implemented as, or include, one or more machine learning models, such as a neural network or a deep learning model. In one embodiment, the coarse module 410 includes an encoder and a coarse decoder.

As further illustrated in FIG. 4, the digital design system 400 also includes a fine module 412 configured to perform wire segmentation of wires and wire-like objects in a full high-resolution image by processing patches predicted to include wires or wire-like objects based on the predictions of the coarse module 410. The fine module 412 can be implemented as, or include, one or more machine learning models, such as a neural network or a deep learning model. In one embodiment, the fine module 412 includes an encoder and a fine decoder. In one or more embodiments, the coarse module 410 and the fine module 412 share the same encoder.

In one or more embodiments, the coarse decoder and the fine encoder have the same architecture but use different weights.

As further illustrated in FIG. 4, the digital design system 400 includes training system 414 which is configured to teach, guide, tune, and/or train one or more neural networks. In particular, the training system 414 trains encoder-decoder networks, such as coarse module 410 and fine module 412, based on training data and using loss functions 418.

As further illustrated in FIG. 4, the storage manager 416 includes a storage manager 416 that includes input data 420 and training data 422. In particular, the input data 420 may include an input images received by the digital design system 400. In one or more embodiments, the training data 422 may include training input images that have been annotated to indicate wire pixels. The training data 422 may further include ground truth global logit maps and ground truth local logit maps corresponding to the training input images.

Each of the components 402-416 of the digital design system 400 and their corresponding elements (as shown in FIG. 4) may be in communication with one another using any suitable communication technologies. It will be recognized that although components 402-416 and their corresponding elements are shown to be separate in FIG. 4, any of components 402-416 and their corresponding elements may be combined into fewer components, such as into a single facility or module, divided into more components, or configured into different components as may serve a particular embodiment.

The components 402-416 and their corresponding elements can comprise software, hardware, or both. For example, the components 402-416 and their corresponding elements can comprise one or more instructions stored on a computer-readable storage medium and executable by processors of one or more computing devices. When executed by the one or more processors, the computer-executable instructions of the digital design system 400 can cause a client device and/or a server device to perform the methods described herein. Alternatively, the components 402-416 and their corresponding elements can comprise hardware, such as a special purpose processing device to perform a certain function or group of functions. Additionally, the components 402-416 and their corresponding elements can comprise a combination of computer-executable instructions and hardware.

Furthermore, the components 402-416 of the digital design system 400 may, for example, be implemented as one or more stand-alone applications, as one or more modules of an application, as one or more plug-ins, as one or more library functions or functions that may be called by other applications, and/or as a cloud-computing model. Thus, the components 402-416 of the digital design system 400 may be implemented as a stand-alone application, such as a desktop or mobile application. Furthermore, the components 402-416 of the digital design system 400 may be implemented as one or more web-based applications hosted on a remote server. Alternatively, or additionally, the components of the digital design system 400 may be implemented in a suit of mobile device applications or "apps."

Figure 5:
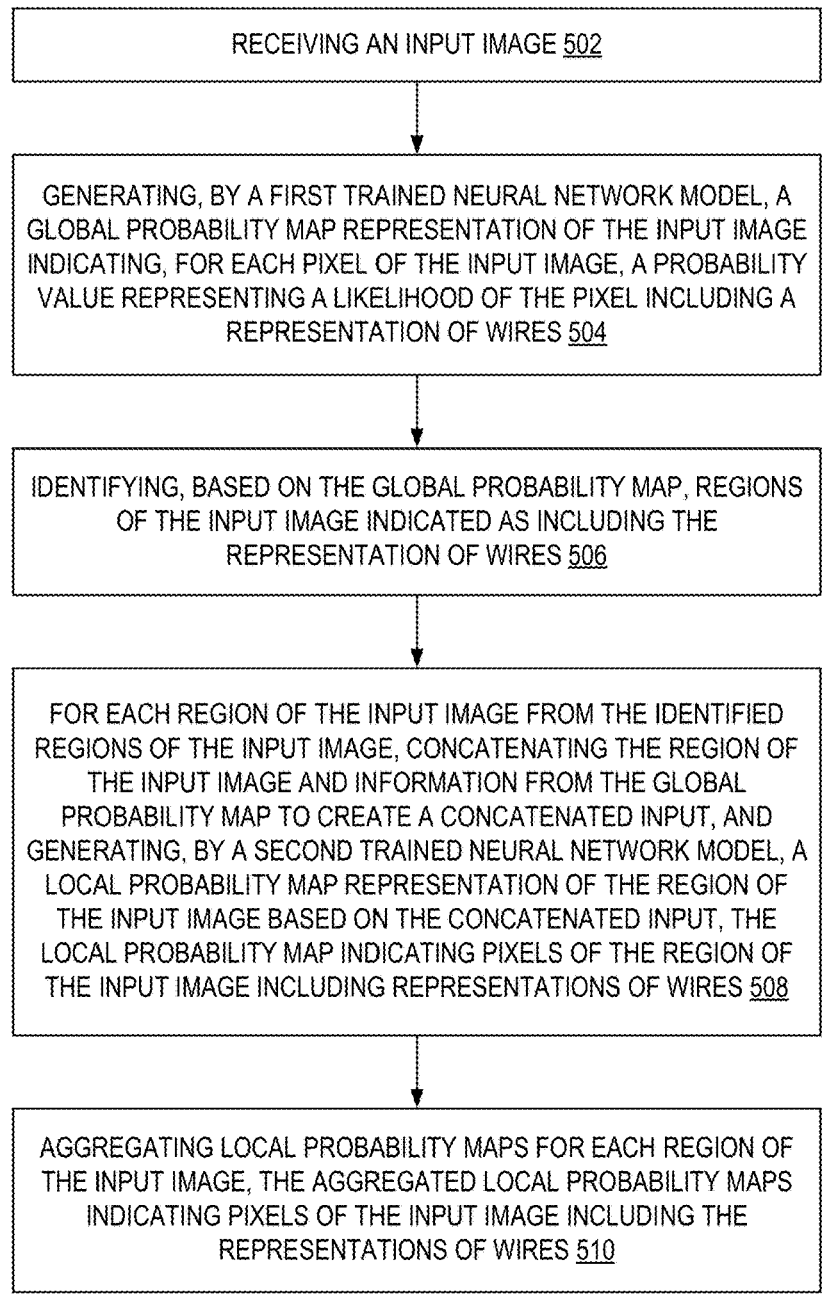
FIG. 5 illustrates a flowchart of a series of acts in a method of performing a wire segmentation of photographic images using trained machine learning models in accordance with one or more embodiments.

FIGS. 1-4, the corresponding text, and the examples, provide a number of different systems and devices that allow a digital design system to perform wire segmentation on images (e.g., high-resolution photographic images) using machine learning models. In addition to the foregoing, embodiments can also be described in terms of flowcharts comprising acts and steps in a method for accomplishing a particular result. For example, FIG. 5 illustrates a flowchart of an exemplary method in accordance with one or more embodiments. The method described in relation to FIG. 5 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of a series of acts in a method of performing a wire segmentation of photographic images using trained machine learning models in accordance with one or more embodiments. In one or more embodiments, the method 500 is performed in a digital medium environment that includes the digital design system 400. The method 500 is intended to be illustrative of one or more methods in accordance with the present disclosure and is not intended to limit potential embodiments. Alternative embodiments can include additional, fewer, or different steps than those articulated in FIG. 5.

As shown in FIG. 5, the method 500 includes an act 502 of receiving an input image. In one or more embodiments, the input image is a photographic image that includes wire and/or wire-like objects. In one or more embodiments, the digital design system receives the input image from a user (e.g., via a computing device). In one or more embodiments, the user may select the input image in an application, or the user may submit the input image to a web service or an application configured to receive inputs.

As shown in FIG. 5, the method 500 also includes an act 504 of generating, by a first trained neural network model, a global probability map representation of the input image indicating, for each pixel of the input image, a probability value representing a likelihood of the pixel including a representation of wires or wire-like objects. In one or more embodiments, the digital design system bilinearly downsamples the input image from an original high resolution to a lower resolution and then passes the downsampled input image through the first trained neural network model. In one or more embodiments, the first trained neural network model is an encoder-decoder model that includes an encoder and a coarse decoder. Using the downsampled input image, the first trained neural network model captures global contextual information from the whole image and highlights, or otherwise indicates, the wire pixels (e.g., the pixels predicted to be representations of wires or wire-like objects).

As shown in FIG. 5, the method 500 also includes an act 506 of identifying, based on the global probability map, regions of the input image indicated as including the representation of wires. In one or more embodiments, for each region of a plurality of regions of the input image, the digital design system determines a percentage of pixels in the region indicated as including representations of wires or wire-like objects. When the percentage of pixels in the region is above a threshold value, the region is identified as one of the regions of the input image that includes representations of wires or wire-like objects. In one or more embodiments, the non-identified regions can be ignored or otherwise treated as a background or non-relevant for the wire segmentation process.

As shown in FIG. 5, the method 500 also includes an act 508 of for each region of the input image from the identified regions of the input image, concatenating the region of the input image and information from the global probability map to create a concatenated input, and generating, by a second trained neural network model, a local probability map representation of the region of the input image based on the concatenated input, the local probability map indicating pixels of the region of the input image including representations of wires or wire-like objects. In one or more embodiments, the information from the global probability map includes the global probability map and a binary mapping indicating the portion of the global probability map corresponding to the region of the input image. In one or more embodiments, the global probability map and the binary mapping are modified to the same resolution as the region of the input image. In other embodiments, the global probability map is cropped to include only the portion of the global probability map corresponding to the region of the input image and the cropped global probability map is modified to the same resolution as the region of the input image.

As shown in FIG. 5, the method 500 also includes an act 510 of aggregating local probability maps for each region of the input image, the aggregated local probability maps indicating pixels of the input image including the representations of wires. Each of the pixels in the local probability maps is assigned a value of "0," indicating the pixel is a background pixel, or "1," indicating the pixel is a wire pixel. After aggregating the local probability maps for each region of the input image that was identified as having wire pixels (e.g., based on the global probability maps), the output is a modified version of the input image at its original high resolution, where all of the identified wire pixels are indicated. In one or more embodiments, the modified version of the input image can be further processed (e.g., by a content aware fill process) to remove and/or replace the wire pixels with new pixels to generate an image without the identified wire pixels.

Figure 6:
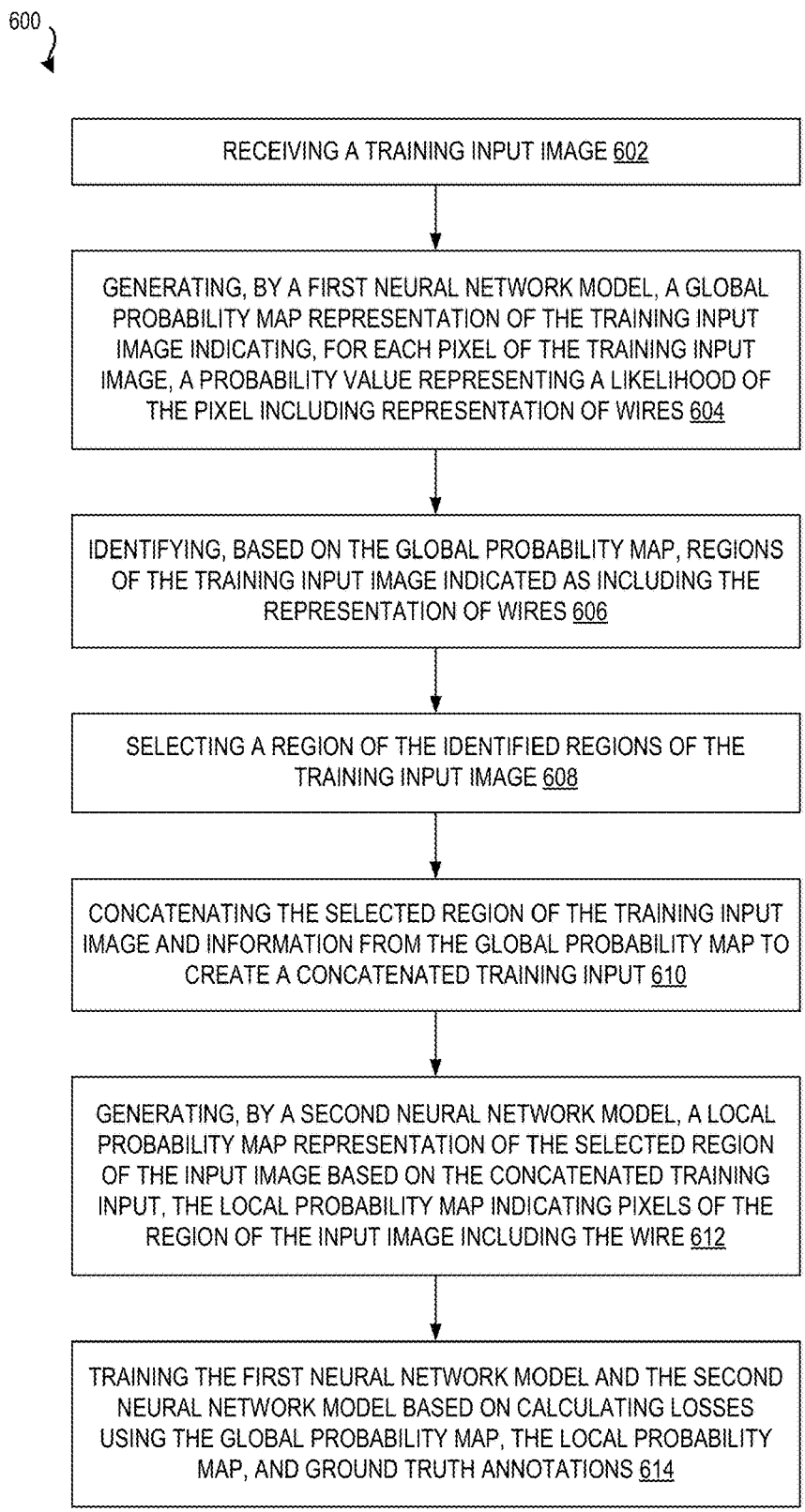
FIG. 6 illustrates a flowchart of a series of acts in a method of training machine learning models to perform wire segmentation of photographic images in accordance with one or more embodiments.

FIG. 6 illustrates a flowchart of a series of acts in a method of training machine learning models to perform wire segmentation of photographic images in accordance with one or more embodiments. In one or more embodiments, the method 600 is performed in a digital medium environment that includes the digital design system 400. The method 600 is intended to be illustrative of one or more methods in accordance with the present disclosure and is not intended to limit potential embodiments. Alternative embodiments can include additional, fewer, or different steps than those articulated in FIG. 6.

As shown in FIG. 6, the method 600 includes an act 602 of receiving a training input image. In one or more embodiments, the training input image is a photographic image that includes wire and/or wire-like objects. In one or more embodiments, the digital design system receives the training input image from a user (e.g., via a computing device). In one or more embodiments, the user may select the training input image in an application, or the user may submit the training input image to a web service or an application configured to receive inputs.

In one or more other embodiments, instead of encoder-decoder models, the trained neural networks can be other types of deep neural network models. For example, the neural network models can be one or both of fully convolutional models using dilated convolutions and diffusion models.

As shown in FIG. 6, the method 600 also includes an act 604 of generating, by a first neural network model, a global probability map representation of the training input image indicating, for each pixel of the training input image, a probability value representing a likelihood of the pixel including a representation of wires or wire-like objects. In one or more embodiments, the digital design system bilinearly downsamples the training input image from an original high resolution to a lower resolution and then passes the downsampled training input image through the first trained neural network model. In one or more embodiments, the first trained neural network model is an encoder-decoder model that includes an encoder and a coarse decoder. Using the downsampled training input image, the first trained neural network model captures global contextual information from the whole image and highlights, or otherwise indicates, the wire pixels (e.g., the pixels predicted to be representations of wires or wire-like objects).

As shown in FIG. 6, the method 600 also includes an act 606 of identifying, based on the global probability map, regions of the training input image indicated as including the representation of wires. In one or more embodiments, for each region of a plurality of regions of the training input image, the digital design system determines a percentage of pixels in the region indicated as including representations of wires or wire-like objects. When the percentage of pixels in the region is above a threshold value, the region is identified as one of the regions of the training input image that includes representations of wires or wire-like objects. In one or more embodiments, the non-identified regions can be ignored or otherwise treated as a background or non-relevant for the wire segmentation process.

As shown in FIG. 6, the method 600 also includes an act 608 of selecting one of the identified regions of the training input image. Using the training input image at its original image resolution and the global logit map generated using the downsampled image at a lower resolution, the digital design system selects a patch (e.g., region, segment, etc.) of the training input image that include a percentage of wire pixels above a threshold value (e.g., at least one percent wire pixels). The digital design system can select the patch with the highest percentage of wire pixels or can randomly select the patch from a set of patches having a percentage of wire pixels above the threshold value.

As shown in FIG. 6, the method 600 also includes an act 610 of concatenating the selected region of the training input image and information from the global probability map to create a concatenated training input. Once the digital design system selects a patch of the training input image, the digital design system generates a concatenated input image for the selected patch by bilinearly concatenating the identified patch from the training input image, the global logit map, and a binary location map, using channel-wise concatenation. The binary location map is a representation of the training input image with the pixels of the identified patch assigned a value of "1" and all other pixels of the identified patch assigned a value of "0".

As shown in FIG. 6, the method 600 also includes an act 612 of generating, by a second neural network model, a local probability map representation of the selected region of the input image based on the concatenated training input, the local probability map indicating pixels of the region of the input image including the wire. In one or more embodiments, the second trained neural network model is an encoder-decoder model that includes an encoder and a coarse decoder. In some embodiments, the second trained neural network model shares a same encoder with the first trained neural network model. Using the concatenated training input, the second neural network model processes the selected regions of the input image and identifies the pixels that include representations of wires or wire-like objects (e.g., wire pixels).

As shown in FIG. 6, the method 600 also includes an act 614 of training the first neural network model and the second neural network model based on calculating losses using the global probability map, the local probability map, and ground truth annotations. In one or more embodiments, the digital design system calculates the loss using the global logit map, the local logit map, and the ground truth logit maps using loss functions. In one or more embodiments, a global probability map and a local probability map are generated by applying a Soft-Max operation to the global logit map and local logit map, respectively. A cross entropy (CE) loss can then be calculated for each of the global probability map and a local probability map. The two losses are summed to calculate a final loss that is backpropagated to the coarse module and the fine module and used to optimize the neural networks.

Figure 7:
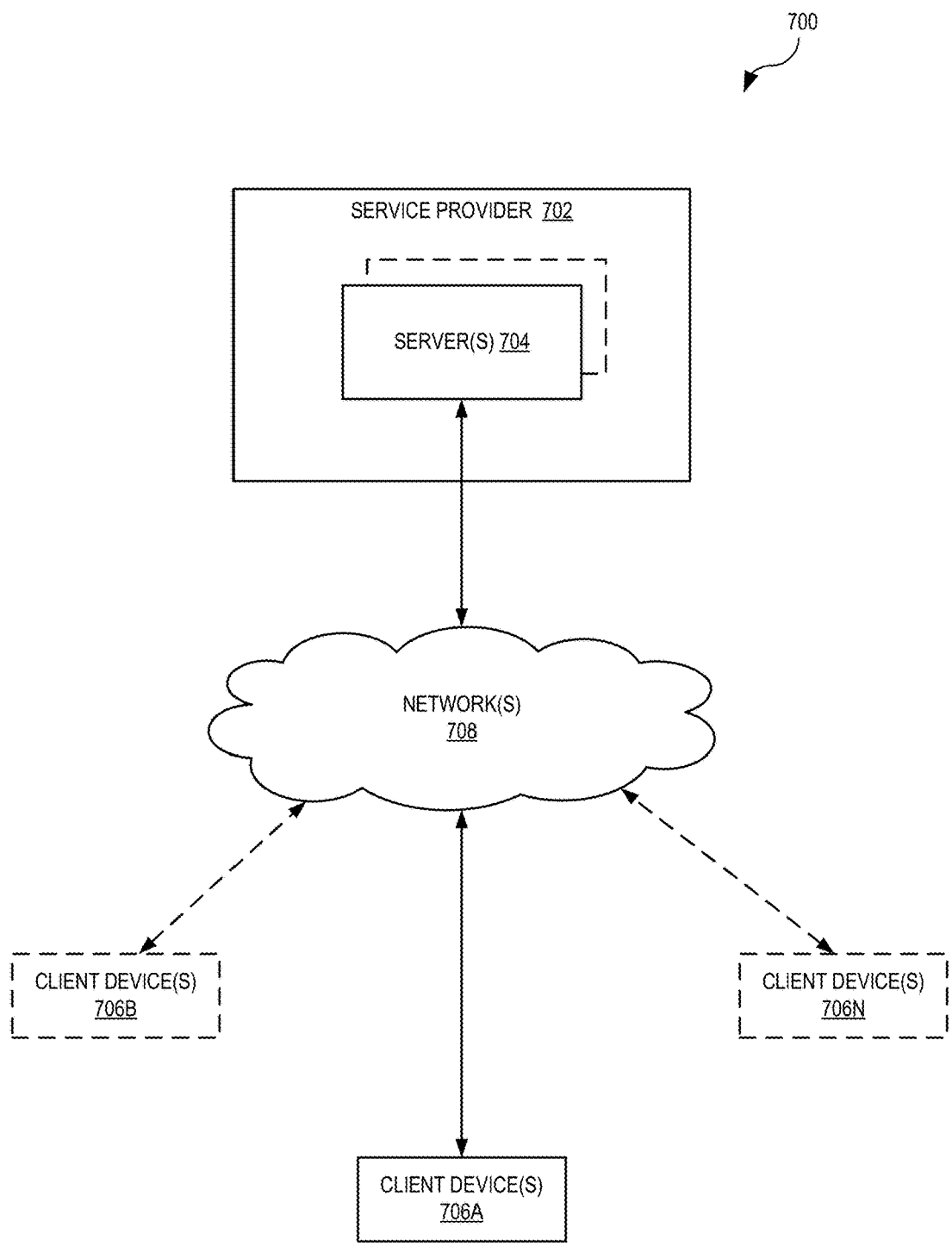
FIG. 7 illustrates a schematic diagram of an exemplary environment in which the digital design system can operate in accordance with one or more embodiments.

FIG. 7 illustrates a schematic diagram of an exemplary environment 700 in which the digital design system 400 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the digital design system 400. In particular, the digital design system 400 may be implemented in whole or in part on the client device 706A. Alternatively, in some embodiments, the environment 700 is implemented in a distributed architecture across multiple computing devices.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access the service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including input data 420 and training data 422, and/or other information. For example, a server 704 may receive data from a client device, such as the client device 706A, and send the data to another client device, such as the client device 706B and/or 706N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the digital design system 400. In particular, the digital design system 400 can comprise an application running on the one or more servers 704 or a portion of the digital design system 400 can be downloaded from the one or more servers 704. For example, the digital design system 400 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or web site hosted at the one or more servers 704.

Upon the client device 706A accessing a webpage or other web application hosted at the one or more servers 704, in one or more embodiments, the one or more servers 704 can provide a user of the client device 706A with an interface to provide inputs, including an input image. Upon receiving the input image, the one or more servers 704 can automatically perform the methods and processes described above to process the input image to segment wires and wire-like objects in the input image.

As just described, the digital design system 400 may be implemented in whole, or in part, by the individual elements 702-708 of the environment 700. It will be appreciated that although certain components of the digital design system 400 are described in the previous examples with regard to particular elements of the environment 700, various alternative implementations are possible. For instance, in one or more embodiments, the digital design system 400 is implemented on any of the client devices 706A-706N. Similarly, in one or more embodiments, the digital design system 400 may be implemented on the one or more servers 704. Moreover, different components and functions of the digital design system 400 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
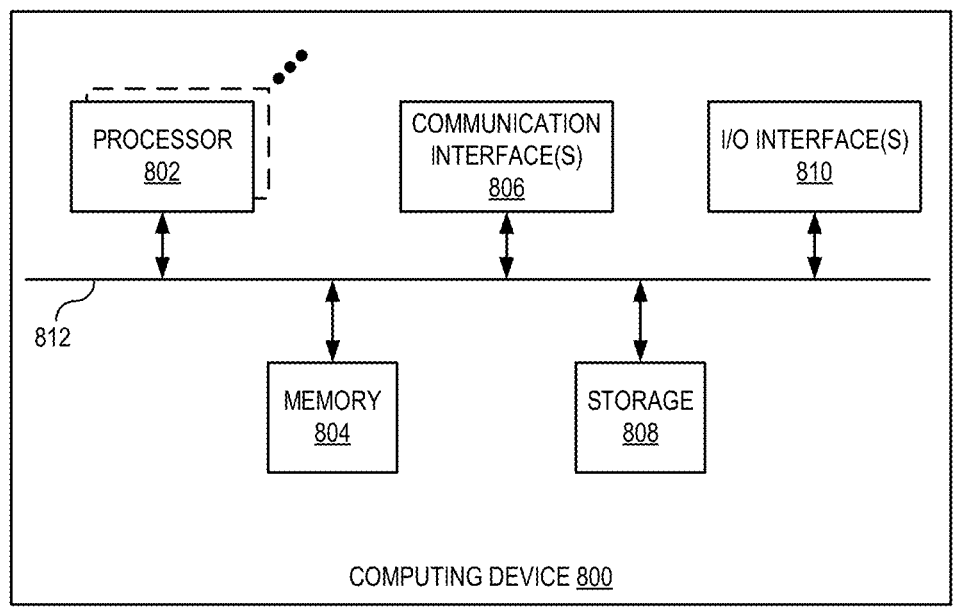
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the digital design system 400. As shown by FIG. 8, the computing device can comprise a processor 802, memory 804, one or more communication interfaces 806, a storage device 808, and one or more input or output ("I/O") devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more I/O devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
   receiving an input image;
   generating, by a first trained neural network model, a global probability map representation of the input image indicating, for each pixel of the input image, a probability value representing a likelihood of the pixel including a representation of wires;
   identifying, based on the global probability map, regions of the input image indicated as including the representation of wires;
   for each region of the input image from the identified regions of the input image,
      concatenating the region of the input image and information from the global probability map to create a concatenated input, and
      generating, by a second trained neural network model, a local probability map representation of the region of the input image based on the concatenated input, the local probability map indicating pixels of the region of the input image including representations of wires; and
   aggregating local probability maps for each region of the input image, the aggregated local probability maps indicating pixels of the input image including the representations of wires.

2. The computer-implemented method of claim 1, wherein generating the global probability map representation of the input image comprises:
   downsampling the input image; and
   passing the downsampled input image through the first trained neural network model.

3. The computer-implemented method of claim 2, wherein downsampling the input image comprises:
  applying a luminance min-filter to generate a min-filtered version of the input image;
  applying a luminance max-filter to generate a max-filtered version of the input image; and
  concatenating the min-filtered version of the input image, the max-filtered version of the input image, and color channel versions of the input image to generate the downsampled input image.

4. The computer-implemented method of claim 1, wherein identifying the regions of the input image indicated as including the representation of wires comprises:
  for each region of a plurality of regions of the input image, determining a percentage of pixels in the region indicated as including representations of wires; and
  identifying the region as one of the regions of the input image indicated as including the representations of wires when the percentage of pixels in the region indicated as including the representations of wires is above a threshold value.

5. The computer-implemented method of claim 1, wherein the information from the global probability map includes the global probability map and a binary mapping indicating a portion of the global probability map corresponding to the region of the input image, the global probability map and the binary mapping modified to a same resolution as the region of the input image.

6. The computer-implemented method of claim 1, wherein the information from the global probability map includes a portion of the global probability map corresponding to the region of the input image, the portion of the global probability map modified to a same resolution as the region of the input image.

7. The computer-implemented method of claim 1, further comprising:
  generating a wire segmentation mask for the pixels of the input image including the representations of wires;
  removing the pixels of the input image including the representations of wires; and
  replacing the removed pixels using a content aware fill process.

8. The computer-implemented method of claim 7, wherein generating the wire segmentation mask for the pixels of the input image including the representations of wires further comprises:
  for each boundary pixel of the wire segmentation mask:
    determining an estimated diameter of a wire indicated by the wire segmentation mask at a boundary pixel, and
    dilating the wire segmentation mask for the boundary pixel based on the determined estimated diameter of the wire at the boundary pixel.

9. A non-transitory computer-readable storage medium including instructions stored thereon which, when executed by at least one processor, cause the at least one processor to:
  receive an input image;
  generate, by a first trained neural network model, a global probability map representation of the input image indicating, for each pixel of the input image, a probability value representing a likelihood of the pixel including a representation of wires;
  identify, based on the global probability map, regions of the input image indicated as including the representation of wires;
  for each region of the input image from the identified regions of the input image,
    concatenate the region of the input image and information from the global probability map to create a concatenated input, and
    generate, by a second trained neural network model, a local probability map representation of the region of the input image based on the concatenated input, the local probability map indicating pixels of the region of the input image including representations of wires; and
  aggregate local probability maps for each region of the input image, the aggregated local probability maps indicating pixels of the input image including the representations of wires.

10. The non-transitory computer-readable storage medium of claim 9, wherein to generate the global probability map representation of the input image, the instructions, when executed, further cause the at least one processor to:
  downsample the input image; and
  pass the downsampled input image through the first trained neural network model.

11. The non-transitory computer-readable storage medium of claim 10, wherein to downsample the input image, the instructions, when executed, further cause the at least one processor to:
  apply a luminance min-filter to generate a min-filtered version of the input image;
  apply a luminance max-filter to generate a max-filtered version of the input image; and
  concatenate the min-filtered version of the input image, the max-filtered version of the input image, and color channel versions of the input image to generate the downsampled input image.

12. The non-transitory computer-readable storage medium of claim 9, wherein to identify the regions of the input image indicated as including the representation of wires, the instructions, when executed, further cause the at least one processor to:
  for each region of a plurality of regions of the input image, determine a percentage of pixels in the region indicated as including representations of wires; and
  identify the region as one of the regions of the input image indicated as including the representations of wires when the percentage of pixels in the region indicated as including the representations of wires is above a threshold value.

13. The non-transitory computer-readable storage medium of claim 9, wherein the information from the global probability map includes the global probability map and a binary mapping indicating a portion of the global probability map corresponding to the region of the input image, the global probability map and the binary mapping modified to a same resolution as the region of the input image.

14. The non-transitory computer-readable storage medium of claim 9, wherein the information from the global probability map includes a portion of the global probability map corresponding to the region of the input image, the portion of the global probability map modified to a same resolution as the region of the input image.

15. The non-transitory computer-readable storage medium of claim 9, wherein the instructions, when executed, further cause the at least one processor to:
  generate a wire segmentation mask for the pixels of the input image including the representations of wires;
  remove the pixels of the input image including the representations of wires; and replace the removed pixels using a content aware fill process.

16. The non-transitory computer-readable storage medium of claim 15, wherein to generate the wire segmentation mask for the pixels of the input image including the representations of wires, the instructions, when executed, further cause the at least one processor to:
for each boundary pixel of the wire segmentation mask:
determine an estimated diameter of a wire indicated by the wire segmentation mask at a boundary pixel, and
dilate the wire segmentation mask for the boundary pixel based on the determined estimated diameter of the wire at the boundary pixel.

17. A system, comprising:
a computing device including a memory and at least one processor, the computing device implementing a digital design system,
wherein the memory includes instructions stored thereon which, when executed, cause the digital design to:
receive a training input image;
generate, by a first neural network model, a global probability map representation of the training input image indicating, for each pixel of the training input image, a probability value representing a likelihood of the pixel including representation of wires;
identify, based on the global probability map, regions of the training input image indicated as including the representation of wires;
select a region of the identified regions of the training input image;
concatenate the selected region of the training input image and information from the global probability map to create a concatenated training input;
generate, by a second neural network model, a local probability map representation of the selected region of the input image based on the concatenated training input, the local probability map indicating pixels of the region of the input image including the wire; and
train the first neural network model and the second neural network model based on calculating losses using the global probability map, the local probability map, and ground truth annotations.

18. The system of claim 17, wherein the instructions to select one of the identified regions of the training input image further cause the digital design system to:
identify, based on the global probability map, a region of the regions of the training input image indicated as including the representation of wires with a highest percentage of pixels including representation of wires.

19. The system of claim 17, wherein the instructions to generate the global probability map representation of the input image further cause the digital design system to:
downsample the input image; and
pass the downsampled input image through the first trained neural network model.

20. The system of claim 17, wherein the information from the global probability map includes the global probability map and a binary mapping indicating a portion of the global probability map corresponding to the selected region of the training input image, the global probability map and the binary mapping modified to a same resolution as the selected region of the training input image.

* * * * *